United States Patent Office 3,303,176
Patented Feb. 7, 1967

3,303,176
PENTAMETHYLSTYRENE, HOMOPOLYMER THEREOF, AND ITS PREPARATION
Eugene C. Capaldi, Glenolden, Pa., Nathan D. Field, Wilmington, Del., and Leonard N. Leum, Media, Pa., assignors to The Atlantic Refining Company, Philadelphia, Pa., a corporation of Pennsylvania
No Drawing. Filed July 31, 1964, Ser. No. 386,788
3 Claims. (Cl. 260—93.5)

This invention relates to 2,3,4,5,6-pentamethylstyrene and to the homopolymer thereof and, more particularly, it relates to the novel monomer and to the high molecular weight homopolymer thereof characterized by having an exceptionally high softening point and being prepared by cationic polymerization.

The various ring substituted monomethyl, dimethyl and trimethyl styrenes have been produced and have been polymerized into their corresponding homopolymers. The polymers obtained from these methyl substituted styrenes, however, are similar to polystyrene in appearance and general behaviour. Contrary to the mono-, di- and trimethyl styrenes, the novel compound, 2,3,4,5,6-pentamethylstyrene, which now has been prepared, has been found to have unique and unexpected properties, and it has been found that it is possible to prepare the homopolymer thereof and that it also has unique and unexpected properties, for example, an extremely high softening point, i.e. about 250° C. or higher, and an inherent viscosity measured at a 0.5 percent concentration in chloroform at 30° C. greater than 0.6.

It is an object of this invention to provide the novel compound 2,3,4,5,6-pentamethylstyrene.

It is another object of this invention to provide a high molecular weight homopolymer of 2,3,4,5,6-pentamethylstyrene.

It is another object of this invention to provide a novel polymer having recurring units of the structure

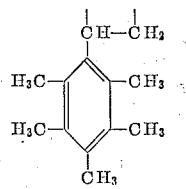

said polymer having a high softening point and a high enough molecular weight to form films, coatings and the like.

It is another object of this invention to provide a method of preparing the homopolymer of 2,3,4,5,6-pentamethylstyrene.

Other objects of the invention will be apparent from the following description and the claims.

The 2,3,4,5,6-pentamethylstyrene may be synthesized from pentamethylbenzene in accordance with one method of preparation of this compound. The pentamethylbenzene is reacted with acetic anhydride in the presence of a Friedel-Crafts catalyst to produce 2,3,4,5,6-pentamethyacetophenone. The pentamethylacetophenone is reduced with lithium-aluminum hydride to the corresponding alcohol, i.e. 1-pentamethylphenyl ethanol. The alcohol is heated with boric acid to produce the desired 2,3,4,5,6-pentamethylstyrene.

Homopolymers are prepared from the 2,3,4,5,6-pentamethylstyrene which have a softening point above 250° C. and have an inherent viscosity, measured at a 0.5 percent concentration in chloroform, greater than 0.6.

The following examples are provided for the purpose of illustrating a specific method of preparation of the 2,3,4,5,6-pentamethylstyrene and the method for the preparation of the homopolymer thereof.

Example 1

To a solution of 29 grams of pentamethylbenzene in about 79 ml. of carbon disulfide was added 58 grams of aluminum chloride (AlCl$_3$). Over a period of 20 minutes, 23.9 grams of acetic anhydride were added to this mixture. The mixture was heated under reflux conditions, i.e. approximately 46° C., for 4 hours at the end of which time HCl was no longer being evolved. The reaction mixture was cooled to room temperature and decomposed by pouring into ice and water. The mixture was extracted with diethyl ether and the ether extract was washed successively with water, a 10 percent sodium hydroxide solution, again with water and then the mixture was dried over magnesium sulfate and charcoal. Removal of the solvent gave a pale yellow solid which was recrystallized from methanol to give 30.8 g. (82.8 percent) of a white crystalline product, melting point 74°–77° C. The product was identified by infrared spectra analysis as the 2,3,4,5,6-pentamethylacetophenone.

To a stirred solution of 2.2 grams of lithium-aluminum hydride (LiAlH$_4$) in 110 ml. of anhydrous diethyl ether was added a solution of 17.5 grams of the 2,3,4,5,6-pentamethylacetophenone in approximately 200 ml. of diethyl ether. The addition was carried out slowly to produce gentle refluxing and the mixture was refluxed for a total of 3.5 hours. The reaction mixture was cooled and water was added slowly. Thereafter the mixture was poured into a mixture of ice and water and about 110 ml. of a 10 percent sulfuric acid solution was added. After separation of the ether layer, the aqueous layer was extrated with two additional portions of diethyl ether and the ether extracts were combined, washed with water, then with a saturated sodium chloride solution and finally dried over magnesium sulfate. When the solvent was removed a white crystalline solid was obtained. Infrared spectra analysis of the solid indicated that some starting material had not been reduced, consequently, the solid was dissolved in 150 ml. of anhydrous ether and this solution was added slowly to a mixture of 2 grams of lithium-aluminum hydride in 50 ml. of anhydrous ether. The reaction mixture was refluxed for 3 hours and 17.6 grams of a white crystalline solid was recovered as described above. This solid had a melting point of 72–75° C. It was recrystallized from methanol until no increase in melting point was found, giving a yield of 15.8 grams (89 percent) of a solid having a melting point of 85–87°. This compound was identified by infrared spectra analysis and nuclear magnetic resonance spectra analysis as 1-pentamethylphenylethanol. In addition the carbon-hydrogen analysis also confirmed the spectra analyses, i.e. C, calculated=81.20 weight percent, found=81.65 weight percent (average of 3 determinations); H, calculated=10.48 weight percent, found=10.67 (average of 3 determinations).

A 5.7 gram sample of the 1-pentamethylphenylethanol and 1.85 grams of boric acid (H$_3$BO$_3$) were added to a 50 ml. round bottomed flask fitted with a Dean-Stark trap. The solid mixture was heated slowly in an oil bath. The white crystalline alcohol melted at a bath temperature of about 90°–95° C. and a clear solution was obtained. The boric acid remained on the bottom of the flask. The heating was continued slowly until a temperature of 270° C. was attained. This temperature was held for 15 minutes. During the heating period water collected in the Dean-Stark tube, the last traces coming over at a temperature of about 155° C. The reaction mixture was cooled to room temperature and as it cooled it solidified. The solid reaction mixture was dissolved in diethyl ether and treated with charcoal and thereafter the solvent was removed. The solid product was purified by sublimation at a pressure of from 0.25 to 0.35 mm. of mercury and the sublimed solid was recrystallized twice from ethanol to give a product having a melting point of 77°–79° C. The structure of the product was identified as 2,3,4,5,6-pentamethylstyrene by infrared spectra and nuclear magnetic resonance spectra analyses and by carbon-hydrogen analysis. In the elemental analysis the carbon calculated=89.59 weight percent, found=89.60 weight percent; hydrogen calculated=10.41 weight percent, found=10.59 percent. Thus the elemental analysis fully confirmed the spectral analysis. The yield of the pentamethylstyrene was 73 percent. The 2,3,4,5,6-pentamethylstyrene thus prepared has the structure

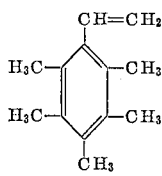

*Example II*

A 2 gram sample of the pentamethylstyrene prepared in Example I was dissolved in 12 ml. of methylene chloride ($CH_2Cl_2$). This solution was added to a flask which had been purged with nitrogen. The solution was cooled with a Dry Ice-acetone bath and while being stirred under nitrogen, 2.5 ml. (measured at room temperature) of $BF_3$ gas was injected into the atmosphere above the stirred mixture. The mixture polymerized to a yellow-orange mass immediately and thereafter the reaction was stopped by the addition of 50 ml. of methyl alcohol and approximately 3 ml. of ammonium hydroxide. After being granulated the polymer was washed with successive portions of methyl alcohol and thereafter the polymer was filtered and vacuum dried. A polymer yield of 85 percent was obtained. The polymer had a softening point of 260° C. as measured on the hot bar and degraded at a temperature between 282° and 310° C. The polymer was soluble in methylene chloride, benzene and chloroform. A clear, transparent polymer film was produced by evaporating the methylene chloride from a methylene chloride solution of the polymer on a glass plate. The inherent viscosity of the polymer was 0.85 at a concentration of 0.5 percent in chloroform at 30° C.

*Example III*

A second 2.0 gram sample of the pentamethylstyrene produced in Example I was dissolved in 25 ml. of methylene chloride and the solution cooled to about −78° C. by means of a Dry Ice-acetone bath under a nitrogen atmosphere. A total of 4 ml. (at room temperature) of $BF_3$ gas were added to the stirred mixture and the polymerization was continued for approximately one hour under nitrogen. The reaction was stopped by the addition of 100 ml. methyl alcohol and approximately 0.1 ml. ammonium hydroxide. The polymer was recovered as described in Example II by washing with 3 successive portions of methyl alcohol and dried in a vacuum oven at 40° C. The polymer had an inherent viscosity of 0.96 as measured by a 5 percent solution in chloroform at 30° C. A total yield of 1.68 grams was obtained. A clear, transparent film was obtained when the methylene chloride was evaporated from a methylene chloride solution of the polymer on a glass plate.

Solvents other than methylene chloride may be employed, for example, carbon disulfide and other solvent to monomer ratios may be utilized. Other Friedel-Crafts type solvents such as nitromethane, nitrobenzene and the like also may be used. Other suitable catalysts, temperatures, times and conditions for carrying out the polymerization are those utilized in low temperature cationic polymerizations such as those used for the polymerization of isobutylene and methyl vinyl ether as described in C. E. Schildknecht's "Vinyl and Related Polymers," John Wiley and Sons, Inc., New York (1952), pages 555 to 557 and 598 to 602.

Other types of polymerization iniation have been found ineffective. Pentamethylstyrene was subjected to free radical initiators, potassium persulfate ($K_2S_2O_8$), in an aqueous emulsion (dodecyl benzene sulfonate emulsifier) at a temperature of from 50° to 80° C. in one experiment and in a second experiment to benzoyl peroxide in a bulk polymerization formula at 80° C., neither of which produced more than traces of methanol insoluble polymeric material.

In two other experiments anionic iniators were employed in an attempt to polymerize the pentamethylstyrene. In the first experiment a butyl lithium initiator was combined with toluene as the solvent and in the second experiment a lithium naphthalene initiator was combined with tetrahydrofuran as the solvent. Temperatures ranging from −78° C. to slightly above room temperature were tried but no polymer was produced.

A portion of the polymer produced in Example II was admixed with a commercial polystyrene which had a softening point of 100° C. When admixed with an equal quantity of the polymer produced in Example II the blend had a softening point of 171° C. This demonstrated that the polymers of this invention may be utilized for blending with styrene homopolymers to increase their softening point and thus render the polystyrene suitable for high temperature uses.

We claim:
1. 2,3,4,5,6-pentamethylstyrene.
2. A process for polymerizing 2,3,4,5,6-pentamethylstyrene comprising contacting the monomer with boron trifluoride at low temperatures of about −78° C. to produce a homopolymer of 2,3,4,5,6-pentamethylstryene having a softening point in the range from about 250° to 260° C. and an inherent viscosity measured at a 0.5 percent concentration in chloroform at 30° C., greater than 0.6 and ranging up to 0.96.
3. A homopolymer of 2,3,4,5,6-pentamethylstyrene having a softening point in the range from about 250° C. to 260° C. and an inherent viscosity measured at a 0.5 percent concentration in chloroform at 30° C., greater than 0.6 and ranging up to 0.96.

References Cited by the Examiner

UNITED STATES PATENTS 2,443,217   6/1948   Amos et al. _____ 260—669

OTHER REFERENCES

Lukin et al.: Journal of Organic Chem., vol. 23, pp. 1007–1009, 1958, copy in Scientific Lib., Call No. QD 241 J–6.

Chemical Abstract, vol. 54, page 17952–e, September–October 1960.

JOSEPH L. SCHOFER, *Primary Examiner.*

JAMES A. SEIDLECK, *Examiner.*